United States Patent [19]
Ross

[11] 3,821,701
[45] June 28, 1974

[54] AUTOMOBILE DECELERATION INDICATING DEVICE

[76] Inventor: Lee E. Ross, 12412 N.E. 6th Pl., Bellevue, Wash. 98005

[22] Filed: May 10, 1972

[21] Appl. No.: 251,948

[52] U.S. Cl............................ 340/71, 200/61.89
[51] Int. Cl...... B60q 1/26, G08b 21/00, H01h 3/14
[58] Field of Search ............ 200/61.89; 340/66, 67, 340/69–72

[56] References Cited
UNITED STATES PATENTS

| | | | |
|---|---|---|---|
| 2,568,610 | 9/1951 | Chappell | 200/61.89 X |
| 2,683,781 | 7/1954 | Milster | 200/61.89 |
| 2,751,522 | 6/1956 | Spangenberg | 340/66 X |
| 3,109,158 | 10/1963 | Coombs | 340/66 |
| 3,281,786 | 10/1966 | Leichsenring | 340/72 X |
| 3,283,301 | 11/1966 | Beasley | 340/70 |
| 3,304,540 | 2/1967 | McAnespey | 340/71 |
| 3,037,188 | 5/1962 | Weigl | 340/70 X |
| 3,395,388 | 7/1968 | Hendrickson | 340/66 X |
| 3,411,134 | 11/1968 | Shames | 340/71 |
| 3,414,879 | 12/1968 | Holland | 340/71 |
| 3,478,312 | 11/1969 | Lee | 340/67 |
| 3,501,742 | 3/1970 | Ellison | 340/71 |
| 3,503,042 | 3/1970 | Skinner | 340/67 |
| 3,626,919 | 12/1971 | MacMillan | 200/61.89 UX |
| 3,702,459 | 11/1972 | Bauchan | 340/66 X |

Primary Examiner—Donald J. Yusko
Assistant Examiner—K. Leimer
Attorney, Agent, or Firm—Graybeal, Barnard, Uhlir & Hughes

[57] ABSTRACT

A caution light mounted on the rear of an automobile to indicate to a following motorist that the automobile is decelerating. Two control switches for the caution light are mounted to the two idler adjustment screws of the carburetor and the caution light is activated by either of the idler screws engaging a respective stop member when the throttle arm moves to its idle position. Activation of either the brake switch or movement of the throttle arm to a power position turns off the caution light.

In a second embodiment, the conventional backup lights of the automobile function as caution lights, with a flasher causing intermittent activation of the backup lights when functioning as a caution indicator.

In a third embodiment, there is a green "go" light which is activated when the automobile is moving forward under power, this "go" light being deactivated by the closing of the brake switch, movement of the throttle arm to its idle position to activate the caution light control switch, or operating the automobile in reverse.

12 Claims, 8 Drawing Figures

PATENTED JUN 28 1974

AUTOMOBILE DECELERATION INDICATING DEVICE

BACKGROUND OF THE INVENTION

1. Field of the Invention

The present invention relates to caution or signaling devices for a powered vehicle such as an automobile.

2. Description of the Prior Art

Aside from the conventional brake lights, turn signal lights, and backup lights that are furnished in many modern day automobiles, there are a number of prior patents which show other signal devices to indicate various conditions to a following motorist.

For example, Coombs, Re. 23,719, shows a yellow caution light that is activated by the throttle foot pedal in an upward position closing a pair of contacts, and a green light that is activated by the throttle foot pedal being depressed to close a second set of contacts. These contacts are connected in series with a switch operated by suction from the intake manifold of the engine to insure that the yellow and green lights are activated only when the engine is operating.

Antunovic, U.S. Pat. No. 3,375,496, shows a switch connected to an accelerator pedal to indicate various traveling conditions relating to the position in which the throttle pedal is depressed.

Rainer, U.S. Pat. No. 3,336,450, shows a linkage unit connected between the foot pedal linkage and the carburetor control arm. When this linkage unit is extended, it activates a "go" signal, while it activates a "slow" signal when the linkage unit is compressed.

Wagner, U.S. Pat. No. 3,320,586 illustrates a lighting system indicating various degrees of speed and accelerating or decelerating conditions of the automobile.

Lane, U.S. Pat. No. 3,492,638, discloses a warning system to indicate a decelerating or accelerating condition, in response to inputs from the braking system and the engine intake manifold.

Hendrickson, U.S. Pat. No. 3,395,388, discloses an amber light and a green light which are activated by a switch connected to the throttle foot pedal. Depressing the throttle activates the green light, while permitting the throttle to return to its "up" position activates the amber light. Closure of a brake switch to activate the brake lights causes another switch in series with the foot pedal switch to open to deactivate both the green and amber lights.

Alcoriza, U.S. Pat. No. 1,878,090, discloses a "slow-stop" signal which is activated through two switches in series, one operable from the foot pedal, and the other operable from the brake.

While a number of prior patents show systems for providing various caution signals for a following motorist, there still is a need for providing an adequate signal system, particularly a reliable system to indicate a lower power condition of the engine causing a possible deceleration of the automobile, which system not only is adaptable for installation on cars being manufactured, but also can readily be installed on existing automobiles, for example, in the form of a convenient retrofit kit.

SUMMARY OF THE INVENTION

In accordance with one aspect of the present invention, there is provided an engine monitoring switch means having a direct operative connection to a carburetor control mechanism for the vehicle, which control mechanism comprises a conventional throttle arm and a throttle stop to engage the throttle arm at its idle position. Movement of the throttle arm to its idle position causes the switch means to activate a caution indicator, while movement of the throttle arm to be disengaged from the throttle stop causes the switch means to inactivate the caution indicator.

In the preferred form, a switch is mounted to the carburetor idler adjustment screw which is in turn mounted to either the throttle arm or throttle stop. To operate the switch, there is in the idler adjustment screw a plunger member which pushes against the switch lever when the throttle arm engages the throttle stop. Where the carburetor control mechanism has two idler adjustment screws, two such switch members are provided, one operable from the choke throttle stop and the other operable from the unchoked throttle stop, with engagement of either of the switches by a related plunger member causing activation of the caution indicator. There is a caution light activating switch operable from the engine monitoring switch means to activate the caution light, this caution light switch being moved to its inactive position by closure of the automobile brake light switch.

In accordance with a second embodiment of the present invention, circuit means are provided so that the conventional backup lights of the vehicle are utilized to function additionally as a caution indicator. In addition to the usual backup light switch, there is a first switch means having a closed position to activate the backup light, with flasher means operatively connected with the first switch means and the backup lights so that power is delivered intermittently to cause the backup light to turn on intermittently. There is a second engine monitoring switch means having a first and second position and being responsive to the engine power condition so that the second switch means moves to its first position to close the first switch means when the engine is at a lower power condition. Either movement of the second switch means to its second position by the engine being at a higher power condition or closure of the automobile brake light switch by operating the brakes of the automobile causes the first switch means to move to its inactive position so that it does not cause the intermittent activation of the caution light.

In accordance with a third embodiment of the invention, there is a cruise indicator to indicate that the vehicle is traveling under power. This cruise indicator is activated by third switch means, which is caused to move to its inactive position by closing of the brake light switch, the backup light switch or the first switch means activating the backup light as a caution light.

DESCRIPTION OF THE PREFERRED EMBODIMENTS

Figure 1:
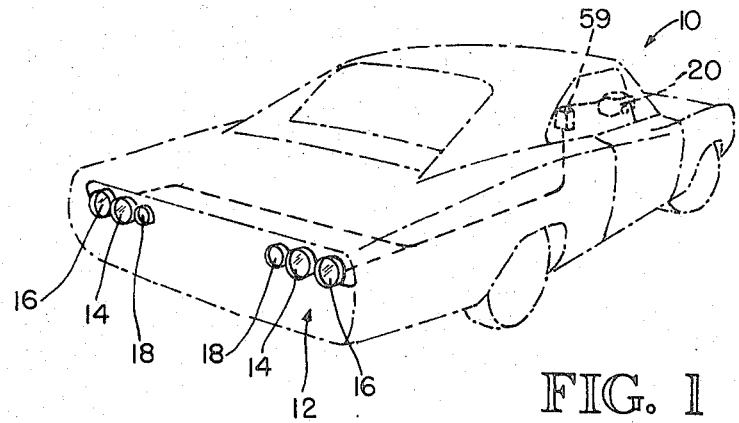
FIG. 1 is a perspective view of an automobile illustrating the manner in which the present invention is installed in a present day automobile.

In FIG. 1 is shown an automobile 10 having a conventional taillight system 12, comprising pairs of right and left brake lights 14, turn signal lights 16 and backup lights 18. In the usual operation of the automobile 10, the brake lights 14 are activated by depression of the brake pedal of the automobile, the turn signal lights 16 are activated by a suitable control lever in the automobile, and the backup lights 18 by positioning the automobile transmission in the reverse position.

Figure 2:
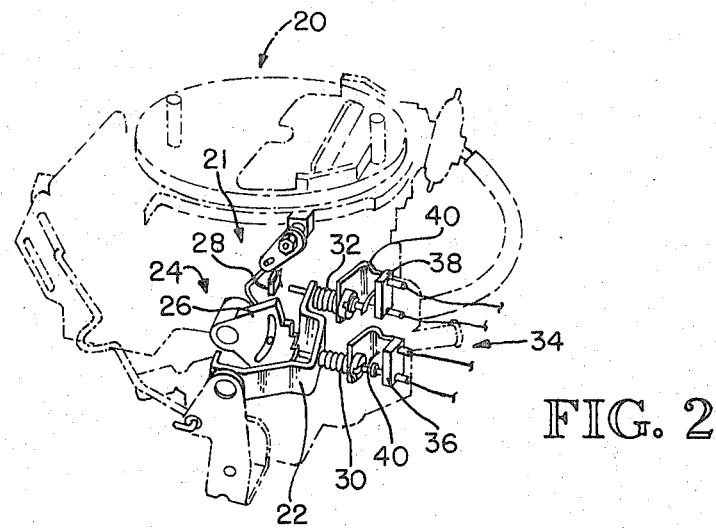
FIG. 2 is a perspective view illustrating an engine monitoring switch assembly of the present invention mounted on the automobile carburetor.

In FIG. 2 is shown a typical carburetor 20 of a present day automobile. This carburetor 20 has a control mechanism 21 comprising a throttle control arm 22 and a throttle stop assembly 24. The throttle stop assembly 24 comprises a first choke stop 26 and a second non-choke stop 28. Threadedly mounted in the control arm 22 are a pair of idler control screws 30 and 32, respectively. When the automobile engine is cold, the choke stop 26 is positioned as shown in FIG. 2 to engage the idler screw 30 to position the control arm 22 in a higher or fast idle position. When the automobile engine is warmed up, the choke stop 26 moves to an out-of-the-way position to permit the second idler control screw 32 to engage the second stop 28 to position the control arm 22 in a lower idle position.

The apparatus as described above exists in this or a somewhat modified form in many, if not the majority, of present day automobiles. The present invention is arranged to be installed in such a present day automobile and function in cooperation with the above recited conventional automobile components, to provide a convenient "slow down" caution signal for a following motorist.

Figure 3:
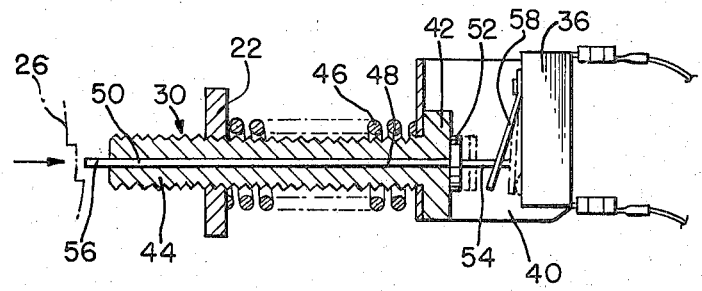
FIG. 3 is a side elevational view, partly in section, illustrating one of the switch elements of the switch assembly of FIG. 2.

In FIGS. 2 and 3 is illustrated a monitoring switch assembly 34 responsive to the power condition of the automobile engine. This switch assembly 34 has a direct operative connection with the carburetor idler control assembly (i.e., the throttle control arm 22, stops 26 and 28, and idler adjustment screws 30 and 32) whereby the switch assembly 34 is responsive to the operating condition of the carburetor 20, which in turn controls the power condition of the automobile engine.

The monitoring switch assembly comprises first and second miniature switches 36 and 38, respectively, each mounted by a related bracket 40 to a respective one of the two idler adjustment screws 30 and 32. With reference to FIG. 3, it can be seen that the idler screw 30 has a head portion 42 and a shank portion 44, with a compression spring 46 surrounding the shank 44 to press against the head 42 from the control arm 22.

The actuating member for the switch 36 is conveniently provided by forming a longitudinal center through hole or bore 48 in the screw 30 and inserting a plunger member 50 in the bore 48. To properly position the plunger 50, it is provided with a head member 52 fixedly attached to the plunger 50 and arranged to bear against the screw head 42. The plunger 50 in its normal position extends at 54 beyond the screwhead 42 and at 56 beyond the opposite forward end of the adjustment screw 30.

When the forward portion 56 of the plunger 50 is engaged by the choke stop 36, the plunger 50 is pushed rearwardly in the screw 30 so that the head end 54 of the plunger 50 engages a control lever 58 of its related switch 36. While not illustrated in detail herein, it is to be understood that the other switch 38 is provided in a similar manner with an actuating plunger 50 in its related idler adjustment screw 32 to engage its related switch 38.

From the foregoing description, it can readily be appreciated that the monitoring switch assembly 34 can easily be installed in a conventional automobile merely by replacing two conventional idler adjustment screws with the modified idler adjustment screws 30 and 32 with their associated switches 36 and 38 mounted thereto by brackets 40, along with the plunger members 50 in their respective screws 30 and 32. The control circuitry of the invention (to be described hereinafter) can be conveniently mounted in a box, as at 59 in FIG. 1, to an adjacent portion of the automobile structure. Thus the present invention is readily adaptable for installation in existing automobiles.

When the automobile engine is cold so that the choke stop 26 is positioned as in FIG. 2, the idle adjustment screw 30 engaged the choke stop 26 when the throttle arm 22 moves to its idle position. In this instance the first switch 36 is operatively engaged by the plunger 50. After the automobile engine has warmed up and the choke stop 26 has moved to its out-of-the-way position, when the throttle arm 22 moves to its idle position, the idler screw 32 comes into contact with the non-choke stop 28 so that its related plunger 50 operatively engages the second switch 38. Thus, regardless of whether the engine is in a cold condition with the carburetor having a higher idle setting or in a warmed-up condition where the carburetor arm 22 has a lower idle setting, the switch assembly 34 responds to the throttle arm 22 moving to its idle position.

Figure 4:
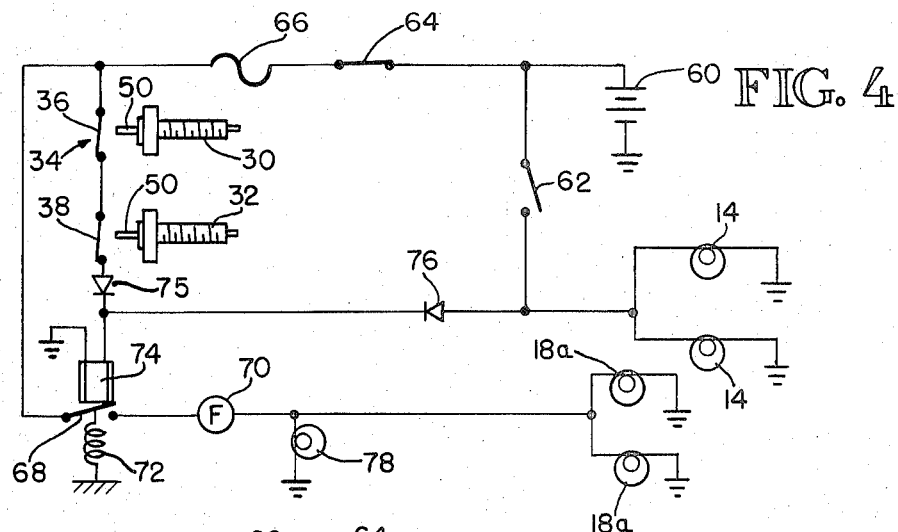
FIGS. 4, 4A and 4B are schematic drawings of a first embodiment of the control circuitry of the present invention in three different operating modes.
Figure 4A:
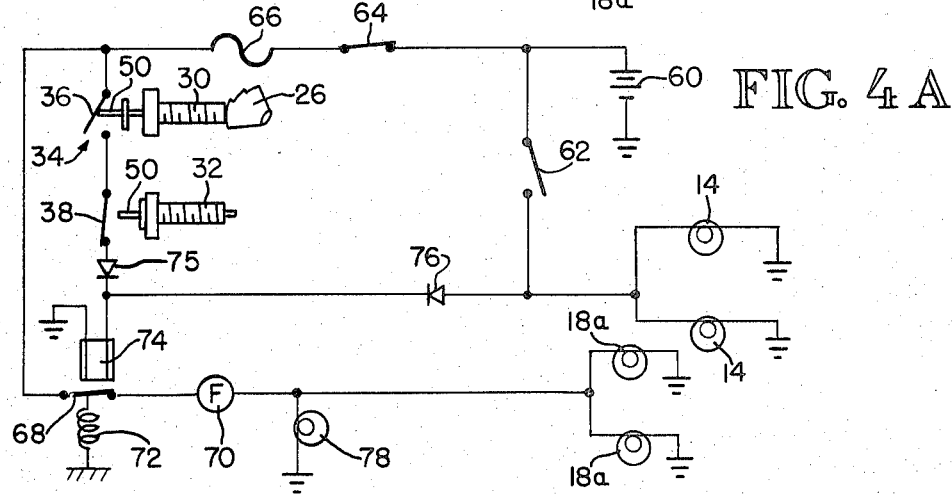
Figure 4B:
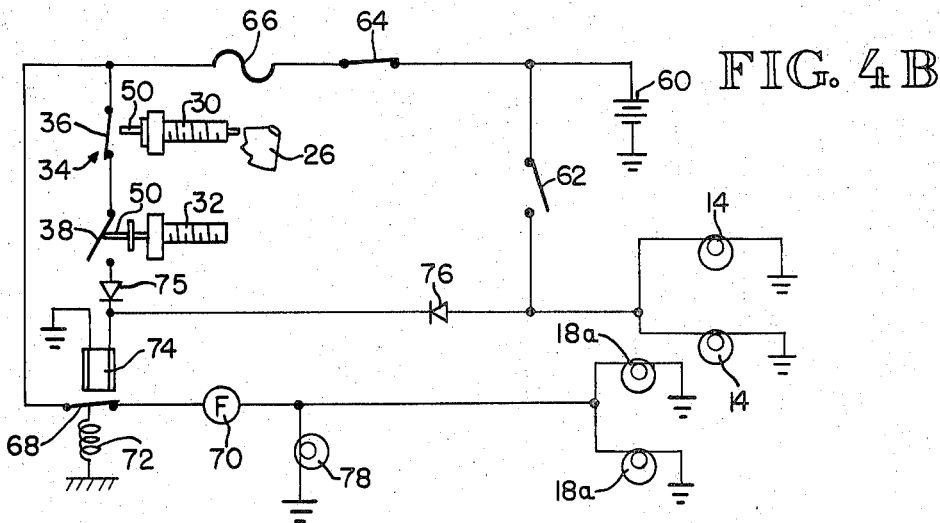

In FIGS. 4, 4A and 4B, there is shown the control circuitry of a first embodiment of the present invention in three different operating modes. In this embodiment, the automobile is not provided with backup lights 18, so caution lights 18a are provided for the specific purpose of indicating a "slow down" condition to a following motorist. The conventional automobile components shown are an automobile battery 60, brake lights 14, a brake light switch 62, an ignition switch 64 and an associated fuse 66. Power is supplied from the battery 60 to the brake lights 14 when the brake switch 62 is closed.

In accordance with the present invention, power is supplied from the battery 60 through the ignition switch 64, through a relay switch 68 and flasher 70 to the caution lights 18a. The relay switch 68 is urged to a closed position, as indicated schematically by a spring 72. A solenoid 74 is arranged to move the relay switch 68 to its open position. The two engine monitoring switches 36 and 38 are connected in series with the solenoid 74 through a diode 75, so that when both switches 36 and 38 are closed, power is delivered to the solenoid 74 to open the relay switch 68. The brake switch 62 is connected through a diode 76 to the solenoid 74 so that closure of the brake switch 62 also activates the solenoid 74 to open the relay switch 68. A caution indicator light 78 is connected at a location between the flasher 70 and the caution lights 18a to indicate operation of the caution lights 18a.

To describe the operation of this first embodiment, let it be assumed that the automobile has first been started and is cruising under power. In this circumstance, the throttle arm 22 is moved away from its throttle stop assembly 24 so that neither of the plungers 50 are in engagement with the respective switches 36 and 38, this situation being illustrated in FIG. 4. Thus current is delivered to the solenoid 74 to open the relay switch 68 so that no power is delivered to the caution lights 18a.

With the engine operating in its cold condition, let it be assumed that the automobile approaches a congested traffic situation and the driver lifts his foot from the accelerator foot pedal. As illustrated in FIG. 4A, the plunger 50 of the idler screw 30 engages the choke throttle stop 26 to open the switch 36. This breaks the flow of current to the solenoid 74 and permits the switch 68 to close and deliver current through the flasher 70 to the caution lights 18a. The flasher 70 causes the caution lights 18a to turn on intermittently and indicate to a following motorist that the engine is in a low power condition and (assuming the automobile is not traveling downhill) that the automobile is in a decelerating condition. When the driver applies the brakes to close the brake switch 62, current is fed through the diode 76 to activate the solenoid 74 and open the relay switch 68, thus deactivating the caution lights 18a as the brake lights 14 turn on.

FIG. 4B illustrates the situation when the automobile engine 10 has warmed up and the choke stop 26 has moved to an out-of-the-way position. In this circumstance, when the driver lifts his foot from the accelerator pedal, the throttle arm 22 moves to its idle position where the non-choke idle adjustment screw 32 engages its related stop 28 to hold the throttle arm 22 in its idle position. This opens the switch 38 to interrupt current to the solenoid 74 and permit the relay switch 68 to close and activate the caution lights 18b.

Figure 5:
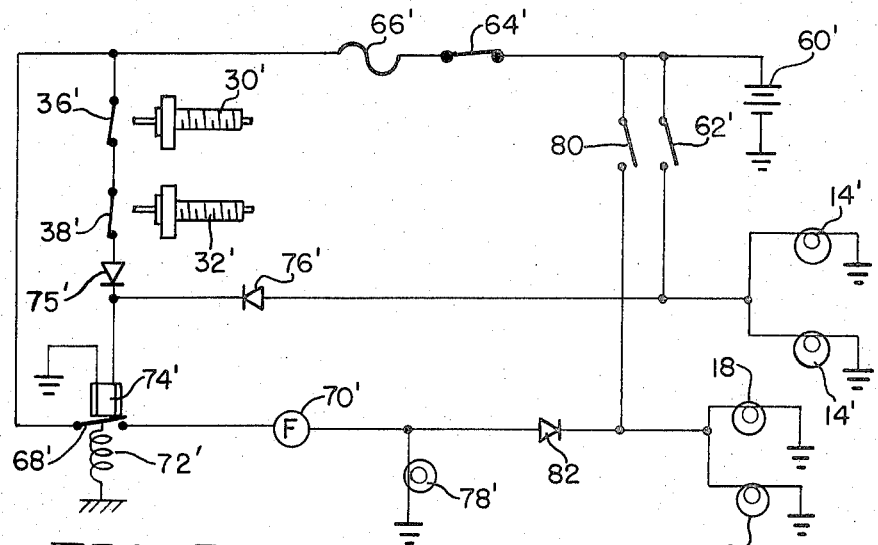
FIG. 5 is a schematic drawing of the control circuitry of a second embodiment of the present invention.

FIG. 5 shows a second embodiment in which the conventional backup lights 18 of the automobile are utilized additionally as caution lights. Components of this second embodiment which are similar to corresponding components of the first embodiment will have like numerical designations, with a prime (') designation distinguishing those of the second embodiment.

As in the first embodiment, power is supplied from the battery 60' through the ignition switch 64' and through the switches 36' and 38' to activate the solenoid 74' to open the relay switch 68'. Likewise, closing the brake switch 62' activates the solenoid 74' to open the switch 68'. The backup lights 18 are connected to the battery 60' through a backup switch 80 in a conventional manner.

When one of the switches 36' or 38' is opened and the brake switch 62' is open, the relay switch 68' is caused to close so that power is delivered through the flasher 70' and a diode 82 intermittently to the backup lights 18. This causes the backup lights to flash on and off to indicate to a following motorist the possible "slow down" condition. When the backup switch 80 is closed, the diode 82 prevents indicator light 78' from being illuminated and feedback through the relay switch 68'.

Figure 6:
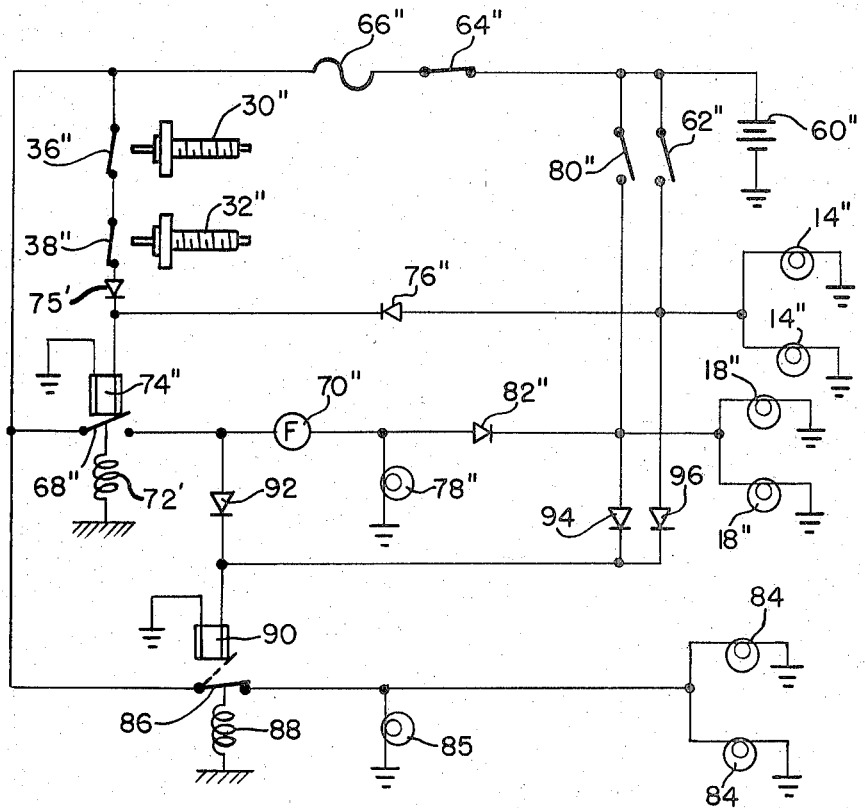
FIG. 6 is a view similar to FIG. 5 showing yet a third embodiment of the control circuitry of the present invention.

FIG. 6 shows a third embodiment of the present invention, in which components similar to corresponding components in the prior two embodiments have like numerical designations, with a double prime (") designation distinguishing those of the third embodiment. In this third embodiment, a pair of cruise lights 84 (desirable green colored lights) are provided to indicate that the automobile is traveling under power in a forward condition.

As in the prior two embodiments, power is supplied from a battery 60" through the relay switch 68" and flasher 70" to activate the backup lights 18" intermittently, to indicate a "slow down" condition. Closure of both switches 36" and 38" or closure of the brake light 62" activates the solenoid 74" to open the switch 68".

There is a cruise light activating switch 86 connected in series between the battery 60" and the cruise indicating lights 84, with an indicating light 85 being provided for the motorist. This switch 86 is urged to a closed position, as indicated schematically by the spring 88. There is a solenoid 90 which, when activated, moves the relay switch 86 to its open position to deactivate the cruise lights 84. This solenoid 90 is connected to each of the caution switch 68", the backup switch 80", and the brake switch 62" through respective diodes 92, 94, and 96.

When the automobile is traveling under power, the three switches 68", 80" and 62" are all open so that the cruise indicator switch 86 remains closed and the cruise light 84 remains on to indicate to a following motorist that the automobile is traveling under power. When the throttle pedal is raised to open one or the other switches 36" or 38", the switch 68" closes to turn on the caution lights 18", the switch 68" also delivering current to the solenoid 90 to open the switch 86 and deactivate the cruise lights 84. When the motorist then depresses the brake to close the brake switch 62", while this causes the switch 68" to open, the brake switch 62" then delivers current to the solenoid 90 to keep the cruise indicator switch 86 in its open position. When the automobile is operated in reverse, closing of the reverse switch 80" also closes the solenoid 90 to deactivate the cruise lights 84.

To summarize the various operating modes of the vehicle with respect to this third embodiment, when the automobile is stationary and the motor is idling, the caution switch 68" will be closed and the backup lights 18" will then be functioning as caution lights and be flashing intermittently. When the automobile is driven in reverse, the backup switch 80" closes to deliver steady power to the backup lights 18" so that these backup lights 18" are then providing a steady light to function as a backup light. When the automobile is moving forwardly under power, the cruise switch 86 is closed so that the cruise lights 84 are lit continuously. When the motorist lifts his foot from the accelerator pedal, the cruise lights 84 are deactivated and the lights 18" begin to flash intermittently to function as caution lights. As soon as the motorist depresses the brake to close the brake switch 62", the brake lights 14" go on and both the lights 18" and the cruise lights 84 are deactivated.

What is claimed is:

1. In a powered vehicle having an engine, vehicle brakes, a brake light, a brake light switch to activate the brake light, a backup light and a backup light switch to activate the backup light with the vehicle in a rearward travel condition, circuit means to operate said backup light with the vehicle in a forward travel condition in a manner to indicate to a following motorist a lower power condition of said engine causing a probable decelerating condition of said vehicle, said circuit means comprising:
  a. a first normally closed relay switch means having a de-energized closed position to activate said backup light and an energized open position not causing activation of said backup light,
  b. second switch means connected to said relay switch means and having a first closed position to energize said relay switch means and a second open position to de-energize said relay switch means, said second switch means being responsive to a condition of said engine so as to move to its first position with said engine being at a higher power condition so that said backup light is not activated, and to its second position with said engine at a lower power condition so that said backup light is activated, and
  c. said relay switch means being also connected to said brake switch so that closing of said brake switch causes said relay switch means to be energized to its open position so that said backup light is not activated.

2. The apparatus as recited in claim 1, wherein there is flasher means connected to said first relay switch means and said backup light so that power is delivered intermittently to cause said backup light to turn on intermittently when said first relay switch means is in its closed position.

3. The apparatus as recited in claim 1, wherein there is a driver indicator means connected to said relay switch means, and diode means between said backup switch and said indicator means, whereby closure of said backup switch does not result in a connection back to said first switch means.

4. The apparatus as recited in claim 1, wherein there is diode means between said brake switch and said second switch means, and there is other diode means between said backup switch and said first switch means, whereby closure of said second switch means does not cause activation of said brake light, and closure of said backup switch does not cause a direct connection back to said first switch means.

5. In a powered vehicle having an engine, vehicle brakes, a brake light, a brake light switch to activate the brake light, a backup light and a backup light switch to activate the backup light with the vehicle in a rearward travel condition, apparatus to operate said backup light with the vehicle in a forward travel condition in a manner to indicate to a following motorist a lower power condition of said engine causing a probable decelerating condition of said vehicle and also to indicate a power cruising condition of said vehicle, said apparatus comprising:
  a. a first switch means having a closed position to activate said backup light and an open position not causing activation of said backup light,
  b. second switch means having a first and second position and being responsive to a condition of said engine so as to move to its first position with said engine being at a higher power condition, and to its second position with said engine at a lower power condition,
  c. circuit means connecting both said second switch means and said brake light switch to said first switch means with the result that either closing of said brake light switch or movement of said second switch means to its first position causes said first switch means to open to deactivate said backup light,
  d. a cruise indicator to indicate that the vehicle is traveling under higher power,
  e. a third switch means having a closed position to activate said cruise indicator, and
  f. other circuit means connecting said third switch means to said brake light switch, to said backup switch, and to said first switch means, to cause said third switch means to open upon closure of one of said brake light switch, said backup switch or said first switch means, to deactivate said cruise indicator, whereby when said vehicle is being braked, is in a rearward travel condition or is in a lower power condition, said cruise indicator is deactivated.

6. The apparatus as recited in claim 5, wherein there is diode means between said third switch means and said brake light switch, said backup switch and said first switch means, whereby closure of one of said brake light switch, said backup switch or said first switch means, does not cause undesired activation of said backup light or said brake light.

7. In a powered vehicle having an engine, vehicle brakes, a brake light, a brake light switch to activate the brake light upon operation of the vehicle brakes, and a caution light to indicate to a following motorist a lower power condition of said engine causing a probable decelerating condition of the vehicle, an apparatus to operate said caution light and to indicate a power cruising condition of said vehicle, said apparatus comprising:
  a. a first switch means having a closed position to activate said caution light and an open position to deactivate said caution light,
  b. second switch means having a first and a second position and being responsive to said engine operation so as to move to a first position upon said engine being in a lower power condition and to a second position upon said engine being in a higher power condition,
  c. circuit means connecting both said second switch means and said brake light switch to said first switch means, with the result that closing of said brake light switch or movement of said second switch means to its second position causes said first switch means to open to deactivate said caution light,
  d. a cruise indicator to indicate that said vehicle is traveling under a higher power condition,
  e. a third switch means having a closed position to activate said cruise indicator, and
  f. other circuit means connecting said third switch means to said first switch means and said brake light switch, to cause said third switch means to open upon closure of either said brake light switch or said first switch means to deactivate said cruiser indicator, whereby when said vehicle is being braked or is at a lower power condition, said cruise indicator is deactivated.

8. The apparatus as recited in claim 7, wherein there is diode means between said third switch means and said brake light switch and said first switch means, whereby closure of said first switch means does not cause activation of said brake light.

9. In a powered vehicle having an engine, a carburetor, and a carburetor control mechanism comprising a throttle arm means and a throttle stop means to engage the throttle arm means at its idle position, and having an automatic caution signal system to indicate to a following motorist a condition of low power input or deceleration of said vehicle, said system comprising a caution indicator mounted to said vehicle in a manner to transmit a caution signal to a following motorist, with means to activate said caution indicator, the improvement comprising:
  a. switch means having a direct operative connection to said carburetor control mechanism characterized in that movement of the throttle arm means to engage the throttle stop means at an idle position moves the switch means to an activating position to activate said caution indicator, and movement of said throttle arm means to be disengaged from the throttle stop means moves said switch means to its inactive position to inactivate said caution indicator, whereby when said carburetor is at an idling condition, a caution signal is transmitted,
  b. said carburetor having a first choke throttle stop and a second throttle stop, and said switch means having a direct operative connection to both of said first and second said throttle stops, whereby operative engagement of the throttle arm means with either the first or second throttle stop moves said switch means to its activating position, and
  c. said switch means comprising a first switch arranged to operatively engage said first throttle stop and a second switch arranged to operatively engage said second throttle stop, said first and second switches being operatively connected to said activating means so that activation of either of said first or second switches activates said caution indicator.

10. The apparatus as recited in claim 9, wherein there is a throttle control adjustment device for each of said first and second throttle stops, whereby said caution indicator is activated at the idle position of the carburetor, regardless of which throttle stop is functioning to set the idle position of the carburetor at any particular time.

11. The apparatus as recited in claim 10, wherein there is for each of the first and second throttle stops a respective first and second idler adjustment screw, and said first and second switches are operatively connected to respective first and second idler adjustment screws.

12. The apparatus as recited in claim 11, wherein each of said idler adjustment screws has a respective plunger means having a retracted and an extended position, and each of said plunger means is moved to its extended position by engagement of the idler adjustment screw upon movement of the throttle arm means to its idle position, with the plunger means then operatively engaging its respective switch to move it to its activating position.

* * * * *